Figure 1:
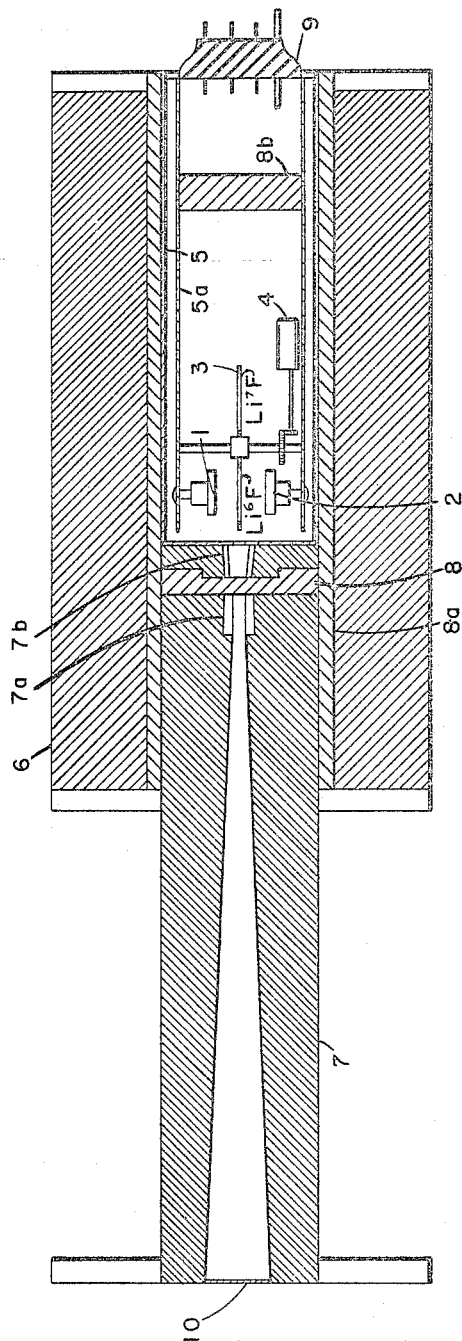

INVENTORS.
Mohammed S. Bokhari
Victor V. Verbinski
Temple A. Love
Richard E. Zedler
BY
ATTORNEY.

INVENTORS.
Mohammed S. Bokhari
Victor V. Verbinski
Temple A. Love
Richard E. Zedler
ATTORNEY.

3,290,500
FAST NEUTRON SPECTROMETER UTILIZING LITHIUM CONTAINING FILMS

Mohammed S. Bokhari, Lahore, Pakistan, and Victor V. Verbinski, Temple A. Love, and Richard E. Zedler, Oak Ridge, Tenn., assignors to the United States of America as represented by the United States Atomic Energy Commission
Filed May 15, 1964, Ser. No. 367,906
6 Claims. (Cl. 250—83.1)

This invention relates to spectrometers for measuring neutron energy and more particularly to a neutron spectrometer employing surface barrier diodes made operable over a relatively wide energy range, and is an improvement over the system of Patent No. 3,129,329 granted to Love et al. on April 14, 1964.

A fast neutron spectrometer was disclosed in the patent to Love et al., supra, wherein a pair of silicon surface barrier diodes were disposed on opposite sides of a thin layer of $Li^6F$ so as to detect the $\alpha + T$ pair resulting from the reaction $LI^6(n, \alpha)T$. The sum of the amplitudes of the pulses detected by the diodes is proportional to the energy of the neutron plus the reaction Q-value of 4.78 mev. The $Li^6F$ used in that spectrometer was preferably deposited upon the surface of one of the detector diodes to a thickness of about 150 $\mu g/cm.^2$.

This prior art structure was found to be very useful over a rather wide range of neutron energies. However, for the special case of measuring neutron spectra from a neutronic reactor, the determination of background became difficult due to the high level of background from higher energy neutrons interacting with the silicon. In addition, the gamma-ray flux in or near a neutronic reactor introduced a high noise-like spectrum which was added to the desired neutron energy spectrum. The evaluation of the background with another pair of diodes without a $Li^6F$ layer was not accurate because it was extremely difficult to match the response due to variations in the sensitive areas, capacitances and depletion depths of the second pair.

Applicants with a knowledge of the problems of the prior art have for an object of their invention the provision of a method and apparatus for measuring the energy spectrum, or distribution of neutrons, and accurately determining the background radiation and subtracting it from the apparent energy spectrum to determine the true energy spectrum.

Applicants have as another object of their invention the provision of a method for measuring the radiation background, including fast neutron background and gamma-ray pileup, with the same detector employed for measuring neutron energy spectra.

Applicants have as another object of their invention the provision of a method and apparatus for extending the range of measurement of neutron spectrometry to include practically the entire spectrum of reactor neutrons by eliminating the effects of radiation background on neutron energy measurements.

Applicants have as another object of their invention the provision of a method and apparatus for reducing the radiation-induced background, including background from fast neutrons above 5 mev. and gamma rays, thus reducing the statistical uncertainty in background correction.

Applicants have as another object of their invention the provision of a method and apparatus for shielding the detector diodes from background-producing radiation in such a way as to least perturbate the neutron spectrum under investigation.

Other objects and advantages of our invention will appear from the following specification and the accompanying drawings, and the novel features thereof will be particularly pointed out in the annexed claims.

Figure 2:
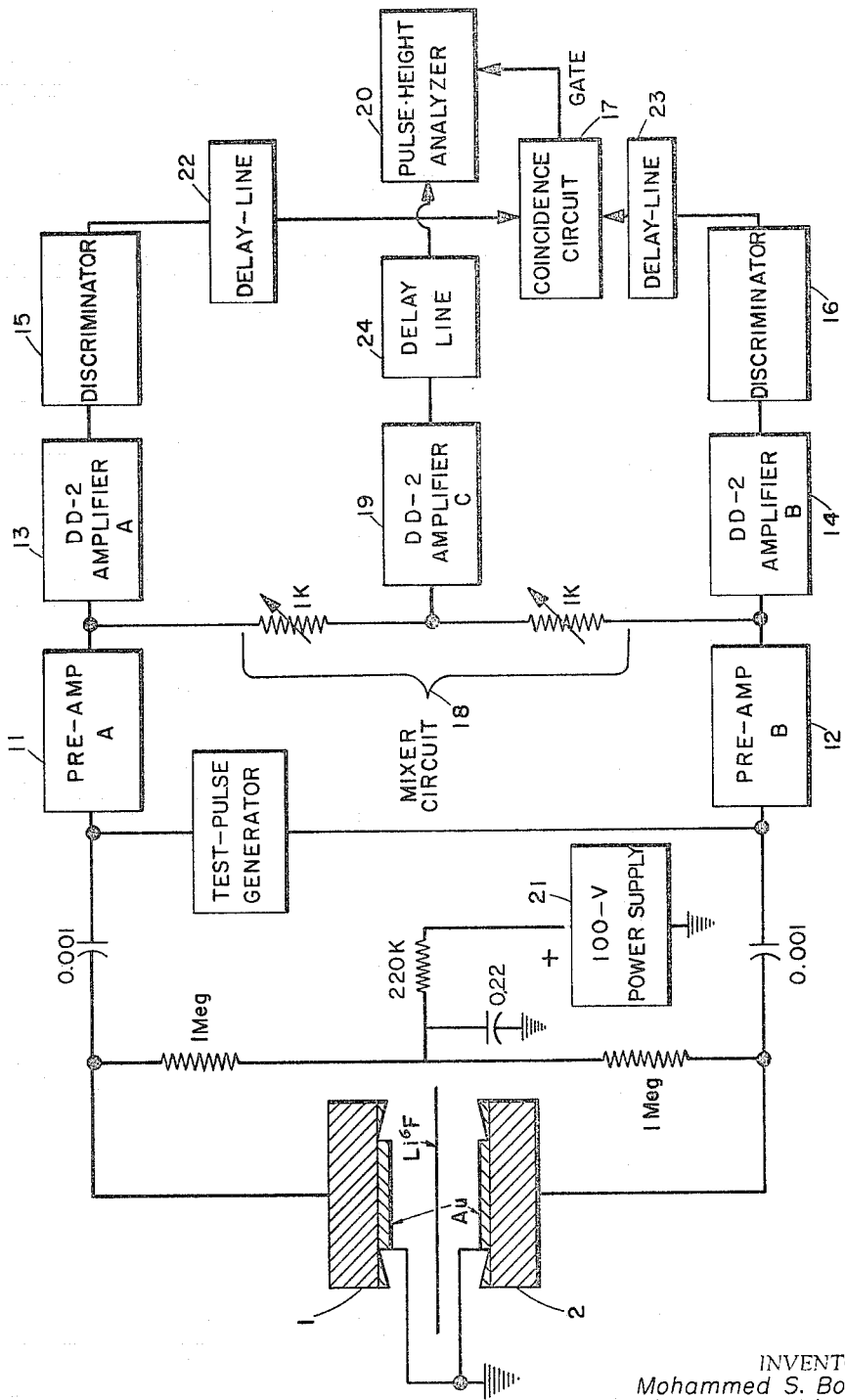
Figure 3:
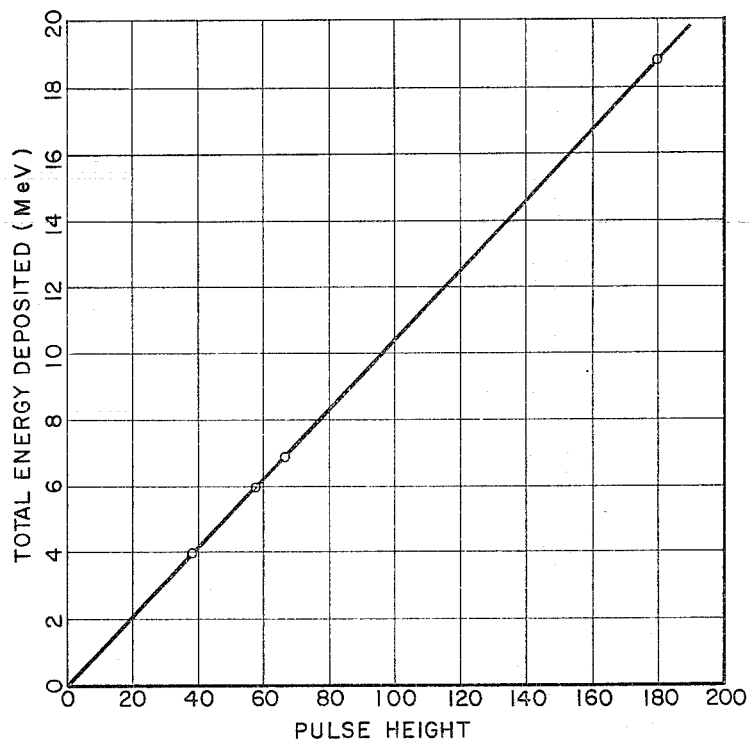
Figure 5:
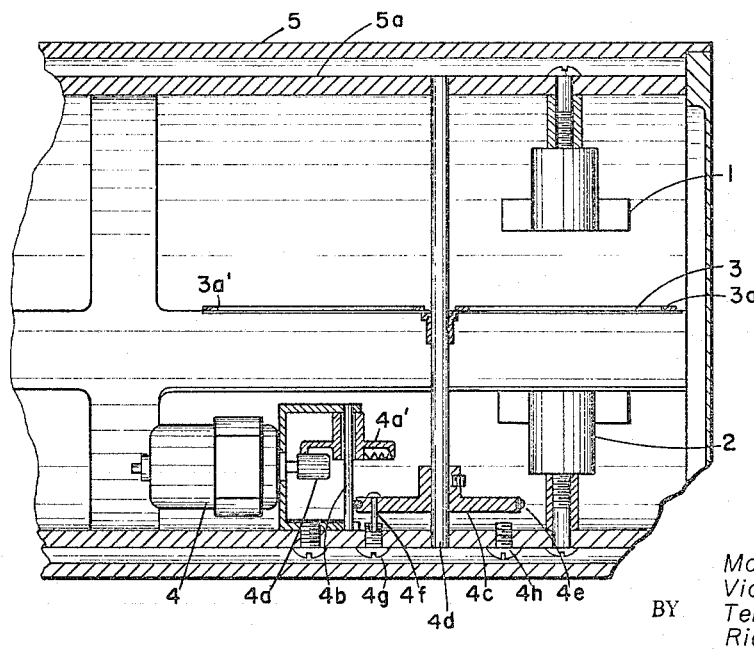
Figure 4:
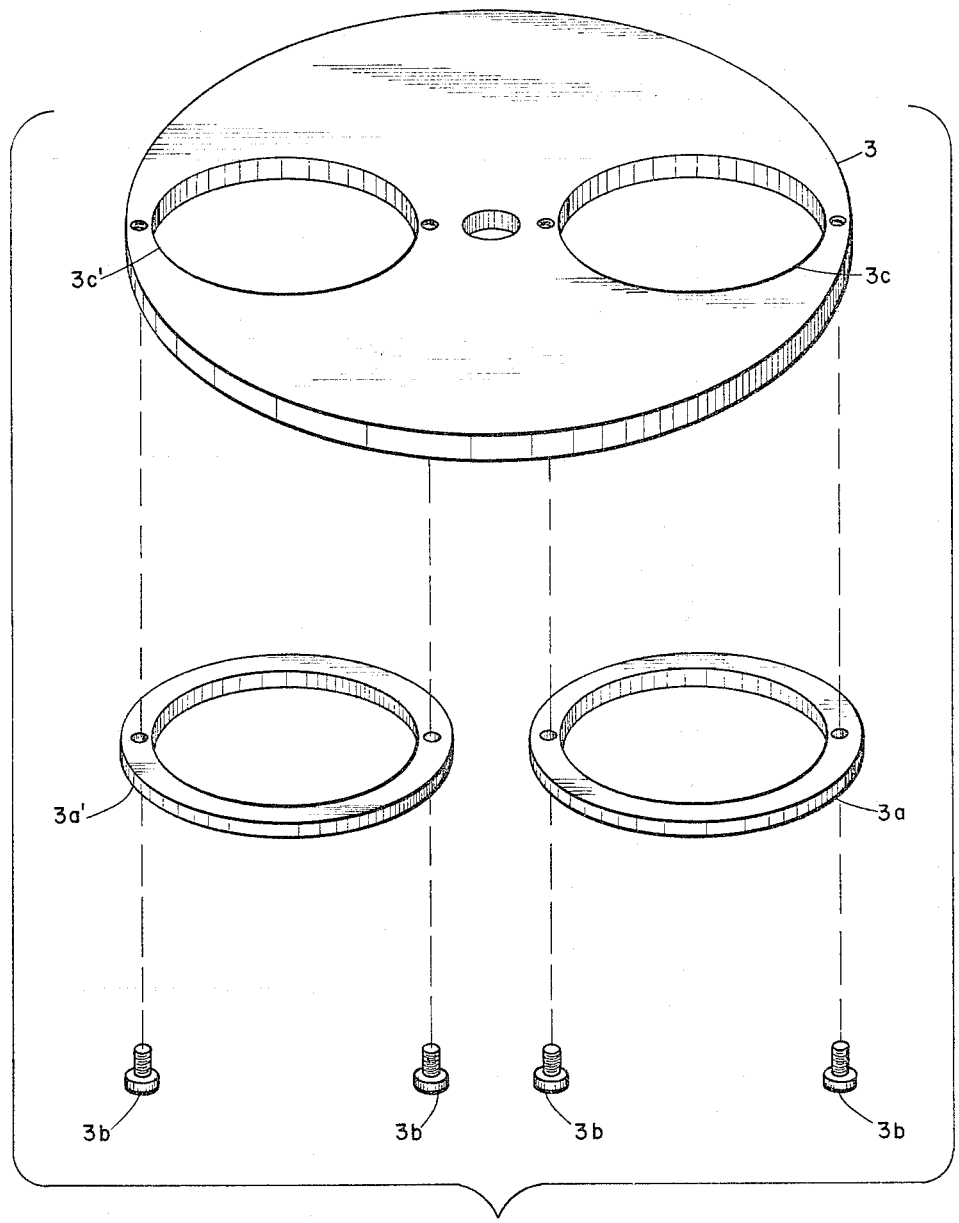

In the drawings, FIG. 1 is a schematic, partly in section, of our improved spectrometer. FIG. 2 is a block diagram of a conventional circuit for utilizing our improved spectrometer. FIG. 3 is a graph of total energy plotted against pulse height recording performance of our improved spectrometer. FIG. 4 is an exploded view of the internal wheel and its parts of our system. FIG. 5 is a sectional elevation of our improved system shown in schematic form.

Referring now to FIG. 1, the improved spectrometer is shown with its arrangement of the parallel-mounted detecting elements 1, 2. Each detecting element comprises a conventional gold-plated silicon surface barrier diode mounted within an insulating support. The opposing faces of the diodes are the gold-plated surface of each. Mounted between the faces of the diodes, in parallel relationship thereto, is a thin rotatable wheel 3, preferably aluminum, driven by a remotely-controlled electric motor 4. As shown in FIG. 4, the wheel 3 is provided with two circular openings $3c$, $3c'$. Attached to and covering the circular openings in the wheel 3 are thin (50 $\mu g./cm.^2$) plastic films, such as Mylar, onto one of which has been deposited $Li^6F$ and onto the other $Li^7F$, to a thickness of about 580 $\mu g./cm.^2$ over an area of approximately 3.75 cm. in diameter. The Mylar films, onto which are deposited $Li^6F$ and $Li^7F$, are attached, e.g., preferably glued, to a pair of rings $3a$, $3a'$. These rings, in turn, are fastened to the wheel 3 preferably with screws $3b$, so as to place the $Li^6F$ and $Li^7F$ deposits over the openings $3c$, $3c'$. The effective area of each of the deposits is preferably larger than that of the sensitive area of the detecting elements. This eliminates problems of accurate alignment for detecting neutrons of all energies.

The wheel 3 is so mounted that the $Li^6$ and $Li^7$ coatings may be separately and alternately positioned between the detectors 1, 2 by operation of an external control switch. A friction drive, such as shown in FIG. 5, is used between the motor and wheel with two mechanical stops utilized for accurate positioning of the coatings.

In FIG. 5, the detectors 1, 2 are so related that when the wheel 3 is properly positioned, the $Li^6F$ or $Li^7F$ deposits are centered therebetween. The rotating mechanism for wheel 3 comprises: the reversible motor 4; a pinion gear $4a$ and crown gear $4a'$ which drive a shaft $4b$; the shaft $4d$ supports wheel 3; a second wheel $4c$ is attached to shaft $4d$; and a friction surface (O-ring) $4e$ on the rim of the wheel $4c$ engages with shaft $4b$.

The accurate positioning of the wheel 3, and particularly the wheel openings $3c$, $3c'$, is accomplished by providing a extending set screw $4f$ in the second wheel $4c$ which strikes against fixed stops $4g$ or $4h$, depending upon the direction of rotation. When the set screw $4f$ is against one or the other of the stops $4g$, $4h$, the shaft $4^b$ and the friction surface $4e$ "slip."

Referring again to FIG. 1, a vacuum housing 5 surrounds the detectors, wheel and motor so as to permit the evacuation of the region between the detectors 1, 2. This aids in compensating for the space between detectors, which space, if occupied by air, would increase energy degradation of the reaction products (the alpha and triton pair). An inner sleeve $5a$ is provided for the support of the internal components. The entire detector unit is shielded from intense gamma ray fields and very fast neutrons by a lead shield 6, and a lead collimator 7 having tungsten inserts $7a$, $7b$ is utilized for improved collimation of gamma rays and neutrons that enter the housing 5 so that they selectively irradiate the $Li^6F$ or $Li^7F$ deposit. The collimator also serves to greatly reduce the bombardment of the semiconductor detectors in housing 5 by either incoming neutrons or gamma rays. Without this shielding of the detectors, the background spectrum subtraction would be impaired. The detector units may also be shielded from thermal neutrons by adding Li$^6$ metal layers 8, 8a, 8b (encased by thin S.S.). All of this Li$^6$ is external to the housing 5, except that portion 8b within sleeve 5a. Electrical leads and a vacuum line are brought into the detector unit through a plug 9 in the rear of the housing 5. Furthermore, since the unit is often operated under water, a thin aluminum window 10 is provided over the opening of the collimator 7 and means (not shown) may be utilized to surround the housing 5 and the cable containing the electrical leads with air at atmospheric pressure to prevent inleakage of water.

Referring now to FIG. 2, a block diagram of the subject spectrometer is shown therein. This is basically the same circuit as the circuit of FIG. 5 of the patent to Love et al., supra. However, it should be noted that the amplifier discriminator and delay line are shown separately instead of being incorporated into the DD-amplifier, as in FIG. 5 of the patent to Love et al., supra. The signal from each of the diodes of the detectors 1, 2 is first fed into its respective preamplifiers 11, 12 and the outputs therefrom are fed into conventional DD-2 (double-delay line) amplifiers 13, 14 having 0.7 μsec. clipping time. The DD-amplifiers 13, 14 may be of the type disclosed in the patent to Fairstem et al., 3,072,851. This DD-amplifier has the advantage of reducing pileup with its distorting effects on pulse height, and of providing a discriminator output signal that is in accurate time reference to the neutron capture event due to the antiwalk discriminator built integrally into the amplifier. If an amplifier with an internal discriminator is utilized, the separate discriminators 15, 16 are not required. However, it should be noted that any other amplifier which is linear over the desired range and from which adequate timing signals may be derived, may be used. The output pulse from each of the amplifiers 13, 14 is fed into discriminator circuits 15, 16, respectively, each of which are biased to reject all pulses which represent an energy less than the minimum energy deposited in either diode by the α-particle of the reaction. The signal from the two channels are then adjusted in time by delay networks 22, 23 to compensate for non-identical transient time differences in each channel before being fed to coincidence circuit 17. The α and T pulses from the reaction then arrive at circuit 17 in coincidence.

The coincidence unit 17 monitoring the pulses from each discriminator requires simultaneous events, rejecting all pulses that are separated by more than the "resolving time" of the coincidence circuit, in this case more than about 75 nsec. Slower or faster resolving times may be used depending upon the total count rate. It responds to Li$^6$(n, α)T events in which the alpha and triton particles are stopped in the separate counters, but eliminates those cases in which energy is deposited in only one counter.

The mixer circuit, comprised of a voltage divider network 18, combines the separate signals from the upper and lower channels (FIG. 2) fed by detectors 1 and 2, respectively, and feeds and combined signals through a DD-amplifier 19, of the type referred to above, to the pulse analyzer 20, preferably of the multi-channel type, for recording the pulse height when there is a coincidence in coincidence circuit 17. Adjustment of the variable resistors in mixer circuit 18 is necessary to compensate for slight difference in gain of each channel. Power is supplied to the circuit from a conventional power source 21.

The action of channel amplifiers 13, 14 is as follows:

The energy deposition in the corresponding counter of more than 1.6 mev. will cause the corresponding discriminator 15 or 16, supplemented by the action of the delay line 22 or 23, to produce a signal which is constant in time (within 75 nsec.) with respect to the reaction event. The coincidence circuit 17 inspects the outputs of both amplifiers 13, 14 to ascertain if a signal appears in both within 75 nsec. As stated previously, this time could be much shorter, and it is considered that this change would be a substantial improvement if faster amplifiers were used to help minimize pileup effects. If a signal from both amplifiers 13, 14 is seen by the coincidence circuit 17, the coincidence circuit will allow the pulse height analyzer 20 to record the pulse that appears in amplifier 19 as a result of the combining of the signals from detectors 1, 2 in the mixer circuit 18. If less than 1.6 mev. is deposited in either counter, the coincidence circuit will not see a signal that particular counter and therefore will not allow the analyzer to record the pulse of amplifier 19. Thus, it will be seen that the coincidence circuit 17 acts as a gating circuit for the pulse height analyzer 20. An appropriate delay line 24 is placed between amplifier 19 and analyzer 20 so that the signals from the respective amplifier 19 and coincidence circuit 17 enter the analyzer 20 in proper time sequence.

When the Li$^6$F is interposed between the detector units 1, 2, the resulting spectrum of incident neutron energies is displayed by the analyzer 20. However, the spectrum as obtained also contains some "background" due to reactions of the neutrons, particularly high energy neutrons, with materials other than the Li$^6$. This background is determined by the introduction of Li$^7$F in place of the Li$^6$F film. The Li$^7$F is therefore placed between the detecting units by operating a control switch (not shown) and the background spectrum then obtained is subtracted from the spectrum obtained with the Li$^6$F in place. Subtraction may be performed manually or electronically (with the aid of memory circuits, subtraction and addition units and computers) to give the desired incident neutron energy spectrum.

The response of our improved spectrometer to thermal 3 mev. and 14.7 mev. neutrons has been measured. The 3 mev. and 14.7 mev. neurtons were obtained from the reactions D(d, n)He$^3$ and T(d, n)He$^4$, respectively, using an electrostatic accelerator. As shown in FIG. 3, this system demonstrated a linearity of response over the wide energy range (data points designate a straight line). The second point from the left is data from the prior art unit. The detection efficiency was measured to be about $3.5 \times 10^{-3}$ for thermal neutrons and has been estimated to be about $5.2 \times 10^{-7}$ for 3 mev. neutrons. The pulse-height distribution obtained for each of the three energy points also demonstrated a deposited energy resolution (energy of α+ T) corresponding to a full width at half maximum 18% for thermal neutrons and 1.1% for 14.7 neutrons. The resolution of the unit can be improved by reducting the thickness of Li$^6$F at the expense of detector efficiency. Reduction of the thickness of the Mylar film and/or placing an identical film of Mylar on either side of the Li$^6$F (and Li$^7$F) results in further improvement of energy resolution without loss of efficiency. The average energy loss over the range of energies measured, that is, the loss in various components was 0.84 mev. The detection efficiency can be increased by an order of magnitude, without appreciably affecting the energy resolution, by using a matrix of diodes on each side of the Li$^6$F with a preamplifier for each element, and independently increased more than a factor of two by utilizing Li$^6$ and Li$^7$ metal in place of the fluoride. The problem of chemical stability of Li metal as the neutron target material is reduced in view of the vacuum employed in the subject device.

While the system has been described as employing Li$^6$F and Li$^7$F it should be emphasized that any suitable lithium-containing substance may be employed. As used herein, lithium-containing substance includes not only the lithium metal but its various compounds, complexes or other forms or combinations where it may exist. There are, however, the following qualifications:

(1) *Cross-section.*—The cross section of the material, other than the Li$^6$, for producing interfering charged particles should be small (less than 10%) as compared to the cross section for the Li$^6$ neutron reaction; and (2) The density of the substance should be as small as possible, since the greater the density, the lower the resolution of the spectrometer. Pure Li would be the best.

Having thus described out invention, we claim:

1. A method of measuring the energies of neutrons over a wide range comprising the steps of interposing a film of a $Li^6$-containing substance between a pair of surface barrier diode detectors in a neutron field, combining and measuring the signals from said detectors, then interposing a film of a $Li^7$-containing substance between the detectors, and combining and measuring the signals from said detectors, and then subtracting the said second signal measurements from the first signal measurements to provide a measure of true neutron energy spectrum.

2. A method of eliminating the traditional background effects on measurements of neutron energy level comprising the steps of interposing a film of a $Li^6$-containing substance between a pair of spaced semiconductor radiation detectors subjected to a neutron field, combining the signals from the detectors and measuring them, then replacing the first named film with a film of a $Li^7$-containing substance, then combining and measuring the signal from the said detectors with the second named film inserted, and subtracting the latter measurements from the former to determine the neutron energy spectrum.

3. A spectrometer for fast neutrons comprising a pair of spaced semiconductor detectors, an element responsive to neutrons for producing a pair of charged particles for each neutron captured by the element, a rotatable disk pivotally mounted to project between the detectors, said first element and said second element mounted in spaced relation on the disk, means for rotating the disk to separately position said first and said second elements between the detectors, and means coupled to the detectors for combining their outputs for separately measuring signals therefrom as the first and second elements are interposed between the detectors to provide a measure of true neutron energy spectrum.

4. A spectrometer for fast neutrons comprising a pair of spaced semiconductor detectors, an element responsive to neutrons for producing a pair of charged particles for each neutron captured by the element, a rotatable disk pivotally mounted and projecting between the detectors, said first element and said second element mounted in spaced relation on the disk, a motor coupled to the disk for rotating it, and means for controlling the operation of the motor to alternately position said first element and said second element between the detectors, and means coupled to the detectors for combining their outputs for separately measuring signals therefrom as the first and second elements are interposed between the detectors to provide a measure of true neutron energy spectrum.

5. The method of claim 2 wherein the first named film is a $Li^6F$ film and the second named film is a $Li^7F$ film.

6. The method of claim 2 wherein the first named film is an $Li^6$ film, and the second film is an $Li^7$ film.

References Cited by the Examiner
UNITED STATES PATENTS

| | | | |
|---|---|---|---|
| 3,129,329 | 4/1964 | Love | 250—83.1 |
| 3,222,521 | 12/1965 | Einfeld | 250—83.1 |

RALPH G. NILSON, *Primary Examiner.*

ARCHIE R. BORCHELT, *Examiner.*